(12) United States Patent
Maddukuri et al.

(10) Patent No.: US 11,429,505 B2
(45) Date of Patent: Aug. 30, 2022

(54) SYSTEM AND METHOD TO PROVIDE OPTIMAL POLLING OF DEVICES FOR REAL TIME DATA

(71) Applicant: DELL PRODUCTS L.P., Round Rock, TX (US)

(72) Inventors: Akkiah Choudary Maddukuri, Austin, TX (US); Arun Muthaiyan, Round Rock, TX (US); Komal Kumar Dhote, Bangalore (IN); Rama Rao Bisa, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/054,489

(22) Filed: Aug. 3, 2018

(65) Prior Publication Data

US 2020/0042415 A1 Feb. 6, 2020

(51) Int. Cl.
*G06F 11/30* (2006.01)
*G06F 8/65* (2018.01)
*G06F 11/07* (2006.01)
*G06F 9/4401* (2018.01)
*G06F 8/654* (2018.01)

(52) U.S. Cl.
CPC ........... *G06F 11/3051* (2013.01); *G06F 8/65* (2013.01); *G06F 9/4411* (2013.01); *G06F 11/0757* (2013.01); *G06F 11/3027* (2013.01); *G06F 11/3055* (2013.01); *G06F 11/3072* (2013.01); *G06F 8/654* (2018.02)

(58) Field of Classification Search
CPC .......... G06F 11/30; G06F 8/65; G06F 9/4411; G06F 11/0757; G06F 11/3027; G06F 11/3051; G06F 11/3055; G06F 11/3072; G06F 8/654; H04L 43/10
USPC ........................................................ 709/224
See application file for complete search history.

(56) References Cited

U.S. PATENT DOCUMENTS

| | | | | |
|---|---|---|---|---|
| 5,659,787 A | * | 8/1997 | Schieltz | H04L 12/4035 |
| | | | | 348/E7.086 |
| 5,835,627 A | | 11/1998 | Higgins et al. | |
| 6,173,323 B1 | * | 1/2001 | Moghe | H04L 43/10 |
| | | | | 340/10.5 |
| 6,735,720 B1 | * | 5/2004 | Dunn | G06F 11/0745 |
| | | | | 714/E11.023 |
| 8,126,574 B2 | | 2/2012 | Discenzo et al. | |
| 8,417,360 B2 | | 4/2013 | Sustaeta et al. | |
| 8,473,647 B2 | * | 6/2013 | Vidal | G06F 1/3203 |
| | | | | 710/46 |
| 8,600,830 B2 | | 12/2013 | Hoffberg | |
| 8,923,806 B2 | | 12/2014 | Johnson | |
| 9,148,744 B2 | * | 9/2015 | Velusamy | H04W 4/50 |
| 9,729,639 B2 | | 8/2017 | Sustaeta et al. | |

(Continued)

FOREIGN PATENT DOCUMENTS

KR 100874773 12/2008

*Primary Examiner* — Thomas J Dailey
(74) *Attorney, Agent, or Firm* — Jackson Walker LLP; Christopher J. Rourk (57) ABSTRACT

A system for polling components is disclosed that includes a plurality of processors and a control system configured to interface with each of the plurality of processors, and to 1) poll each of the plurality of processors using a first polling loop and 2) transfer one of the plurality of processors to a second polling loop if the one of the plurality of processors is non-responsive to the poll.

17 Claims, 4 Drawing Sheets

(56) References Cited

U.S. PATENT DOCUMENTS

| | | |
|---|---|---|
| 2002/0046273 A1 | 4/2002 | Lahr et al. |
| 2008/0004904 A1 | 1/2008 | Tran |
| 2009/0204237 A1 | 8/2009 | Sustaeta et al. |
| 2010/0189024 A1* | 7/2010 | Xhafa .................. H04W 76/28 370/311 |

* cited by examiner

SYSTEM AND METHOD TO PROVIDE OPTIMAL POLLING OF DEVICES FOR REAL TIME DATA

TECHNICAL FIELD

The present disclosure relates generally to control of components within a complex system, and more specifically to a system and method to provide optimal polling of devices for real time data.

BACKGROUND OF THE INVENTION

Polling devices can result in substantial system delays when devices become inoperative and do not respond to polls. As a result, polling is not frequently used because of such problems.

SUMMARY OF THE INVENTION

A system for polling components is disclosed that includes a plurality of processors and a control system configured to interface with each of the plurality of processors, and to 1) poll each of the plurality of processors using a first polling loop and 2) transfer one of the plurality of processors to a second polling loop if the one of the plurality of processors is non-responsive to the poll.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

A polling module can be used in a real-time system to poll the status of the devices of the system. These devices can be inter-integrated circuit (I2C) devices or other suitable devices, and can be continuously polled at discrete intervals to obtain real-time status data. In such cases, there could be one or more devices that fail and which do not respond to the poll, resulting in a timeout condition. A continuing timeout condition will affect the polling of devices that are working from getting or providing real time data.

To address this condition, I2C bus and device recovery can be automatically triggered after I2C timeout or other error conditions. The I2C recovery logic can require more than 100 milliseconds time to complete operation. In a worst case scenario, the combination of a force stop condition, a predetermined number of clock unravelling pulses and pulling the clock low for 100 milliseconds can make it more difficult to get real time data from the devices on other I2C buses, and from the devices behind an I2C multiplexer on the same I2C bus. Also, there will be scenarios where the polling module ends up in a slower polling rate because of other asynchronous events, such as a device reset. When that occurs, the polling module has to drop low priority devices in favor of high priority devices.

These problems are addressed by the present disclosure. For device failure, a polling or monitoring module can mark a device as an error device, such as after the first failure of the device or after a predetermined number of failures. The polling/monitoring module can then start polling at lower priority and rate, such as by sending a single command to determine whether the device has started responding. Once the device starts responding and looks healthy, it is moved back to the normal polling queue/rate.

Accrued delay can also be accommodated. The polling/monitoring module can track the minimum and maximum polling rate for each device, and can initially try to poll at a maximum rate for all devices. On detection of delay, the polling/monitoring module can move to the minimum rate first, then slowly start to increase the rate towards maximum. If a slowdown in response time is detected, the increase can be stopped or suspended. An increase in the polling rate can then be restarted after a fixed delay.

The present disclosure also allows the I2C bus or other suitable communications media to be used for critical transactions, such as firmware update of power supply units, input/output modules or other suitable equipment. In addition to being used to monitor devices, the I2C bus can be used for end device firmware update. The polling/monitoring module can poll all the devices at lower rate and the firmware update for a specific module can be performed at a high priority. Once the firmware of the device completes, the polling/monitoring module can move the device to the normal polling queue/rate.

The present disclosure thus provides a number of important technical features. One technical feature is a method to automatically detect a failing device and to remove the failing device from the normal status loop. Instead, the failing device is placed into a separate error checking loop, to reduce system resources that are required to monitor the status of the device until it has been recovered.

Another important technical feature is a method to automatically detect congestion and to automatically correct it by controllably decreasing and/or increasing polling speed. The polling/monitoring module of the present disclosure can adjust polling speed for failed components to eliminate congestion, and can increase the polling speed in a controlled process to prevent the polling of failed components from impacting the polling speed for operating components.

Another important technical feature is a method to perform critical transactions with highest priority over the I2C bus. The polling/monitoring module of the present disclosure allows transactions such as software updates to be performed over the I2C bus and can delay polling or other non-critical functions until the software updates are completed.

Figure 1:
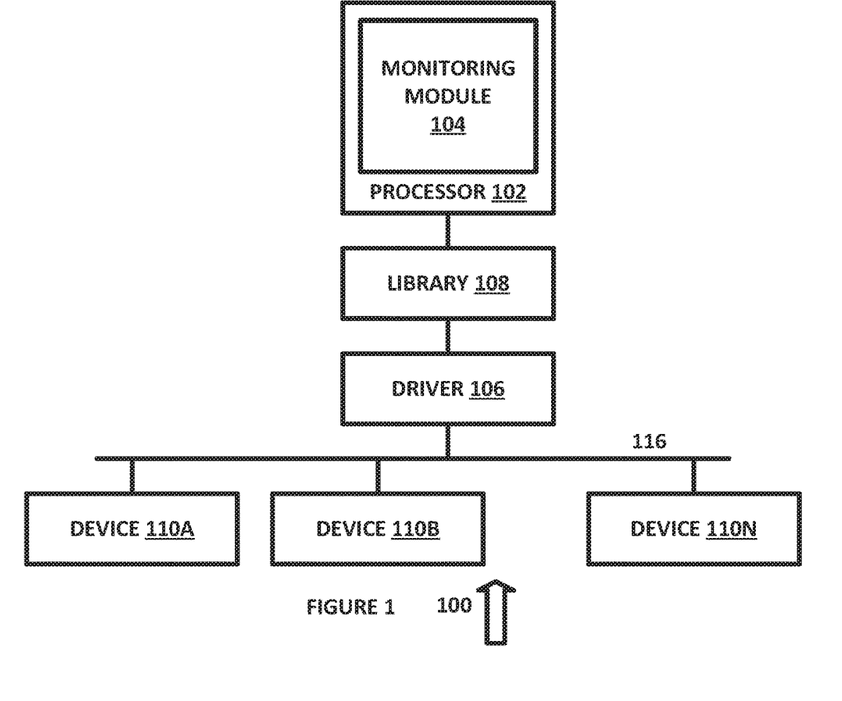
FIG. 1 is a diagram of a system for polling components over a bus, in accordance with an example embodiment of the present disclosure.

FIG. 1 is a diagram of a system 100 for polling components over an I2C bus, in accordance with an example embodiment of the present disclosure. System 100 includes processor 102, which operates monitoring module 104, driver 106, library 108 and devices 110A through 110N, each of which can be implemented in hardware or a suitable combination of hardware and software.

Processor 102 and monitoring module 104 can operate on a processor of a Dell PowerEdge server, available from Dell of Austin, Tex., or other suitable devices that include an I2C or other similar data buses. In one example embodiment, monitoring module 104 can be configured to poll devices, systems and subsystems coupled to the I2C bus, and to request status data, transit control data and perform other suitable functions as disclosed herein. In this embodiment, monitoring module 104 can adjust the polling interval to reduce the amount of time that is spent polling components that have failed, to reduce the processing load on the I2C bus for such monitoring.

Driver 106 is coupled to library 108 and devices 110 through 110N, and allows monitoring module 104 to implement polling threads for devices 110A through 110N. Driver 106 can operate under control of monitoring module 104 to transmit and receive data over an I2C bus 116 or other suitable communications media.

Library 108 can provide driver modules for interfacing with different systems, subsystems and components over I2C bus 116. Devices 110A through 110N can be used for normal priority thread processes or low priority thread processes, as a function of whether the devices associated with each process are operable or failed. Although three devices/processes are shown, the indication of "N" for device 110N is used to indicate that a suitable number of additional processes can be accommodated.

In operation, monitoring module 104 is configured to adjust a polling period as a function of whether a device is operating or failed, and to use a normal priority thread for operating devices and a low priority thread for failed devices. In this manner, the I2C bus 116 bandwidth and associated resources will not be wasted on failed devices, and can instead be used to provide the technical advantage of additional functionality, such as software or firmware updating.

Figure 2:
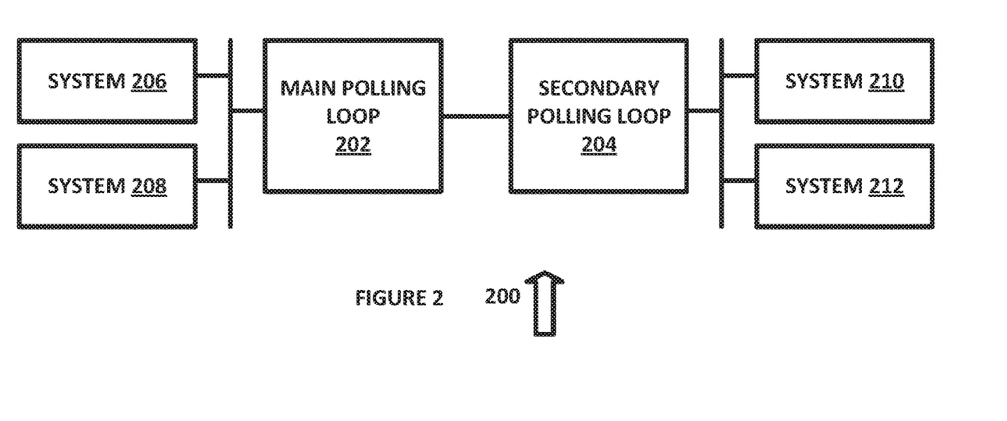
FIG. 2 is a diagram of a system for providing a main polling loop and a secondary polling loop, in accordance with an example embodiment of the present disclosure.

FIG. 2 is a diagram of a system 200 for providing a main polling loop and a secondary polling loop, in accordance with an example embodiment of the present disclosure. System 200 includes main polling loop 202 and secondary polling loop 204, which can be processes operating on the same hardware module, or different hardware modules or in other suitable manners.

Main polling loop 202 includes systems 206 and 208, which have passed the most recent health check (e.g. a poll), and systems 210 and 212, which have failed the most recent health check. In one example embodiment, systems 206 and 208 use normal priority threads for polling with main polling loop 202, and systems 210 and 212 use low priority threads for polling with secondary polling loop 204.

In one example embodiment, main polling loop 202 and secondary polling loop 204 can operate as independent systems in conjunction with a monitoring module, such as by running separate processes that operate independently of each other and with specific interfaces to each other. In this embodiment, main polling loop 202 can use normal priority threads to poll systems 206 and 208, and secondary polling loop 204 can use low priority threads to poll systems 210 and 212, where a thread is a threaded processor function that interfaces with one or more systems that are external to the processor.

Figure 3:
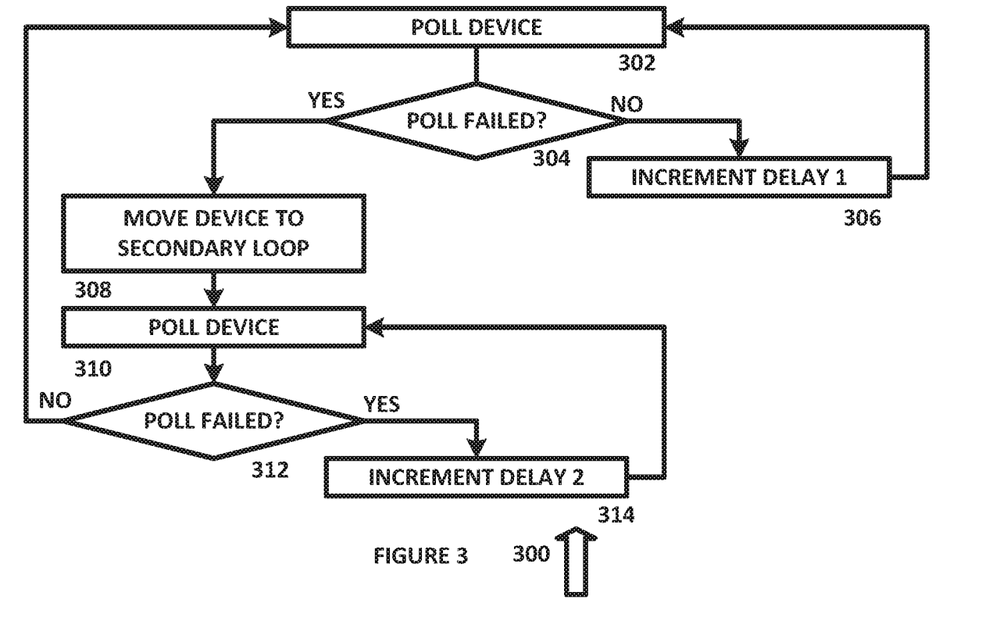
FIG. 3 is a diagram of an algorithm for providing a main polling loop and a secondary polling loop, in accordance with an example embodiment of the present disclosure.

FIG. 3 is a diagram of an algorithm 300 for providing a main polling loop and a secondary polling loop, in accordance with an example embodiment of the present disclosure. Algorithm 300 can operate on one or more processors.

Algorithm 300 provides a main loop that handles normal polling of multiple devices, and a secondary loop that handles polling of one or more failed devices. When device transaction fails, the transaction request is moved to the secondary loop. This secondary loop is a health check loop that will continue to check on the failed device separate from the main loop. The main polling loop and the secondary/health check loop can thus run concurrently, so that a device failure has no operating impact on other devices resulting from slowed communications processes. Once a device is healthy, the transaction request is then moved back to the main polling loop.

Algorithm 300 begins at 302, where a device is polled. In one example embodiment, the device can be polled over an I2C bus, with a status poll, a data request, a first threaded sequence of programmed instructions that can be managed independently by an operating system scheduler, or other suitable polls. The algorithm then proceeds to 304.

At 304, it is determined whether the poll has failed, such as if the device has failed to respond within a predetermined period of time, whether the device has responded with a failure code or an incorrect response, or any other failed response. If it is determined that the poll has not failed, the algorithm proceeds to 306 where a delay to repeat the poll is incremented by a first shorter delay period. The algorithm then returns to 302 where a next device is polled, if there is one, or the same device is polled again after the first shorter delay period. If it is determined that the poll has failed, the algorithm proceeds to 308.

At 308, the device is moved to a secondary loop for further polling. In one example embodiment, a second thread can be instantiated and the first thread can be terminated, where the second thread has a lower priority than the first thread, or other suitable processes can also or alternatively be used. The algorithm then proceeds to 310.

At 310, the failed device is polled, such as at a second longer delay period. In one example embodiment, the poll can be limited to a single type of poll, such as to determine whether the device has changed its operating state. The algorithm then proceeds to 312, where it is determined whether or not the poll has failed. If it is determined that the poll has not failed, the algorithm returns to 302, and a state of the device can be modified or other suitable processes can be implemented, as discussed further herein. Otherwise, the algorithm proceeds to 314 where the delay to send a new poll to the device is incremented by a second longer delay period, and the algorithm returns to 310.

In operation, algorithm 300 allows a failed component to be removed from a first higher frequency polling loop to a second lower frequency polling loop, so as to conserve processing resources and bandwidth on an I2C bus or other suitable communications media. While algorithm 300 is shown as a flow chart, it can also or alternatively be implemented as two or more flow charts, one or more objects or agents, one or more state diagrams, on one or more processors or other devices, or in other suitable manners.

Figure 4:
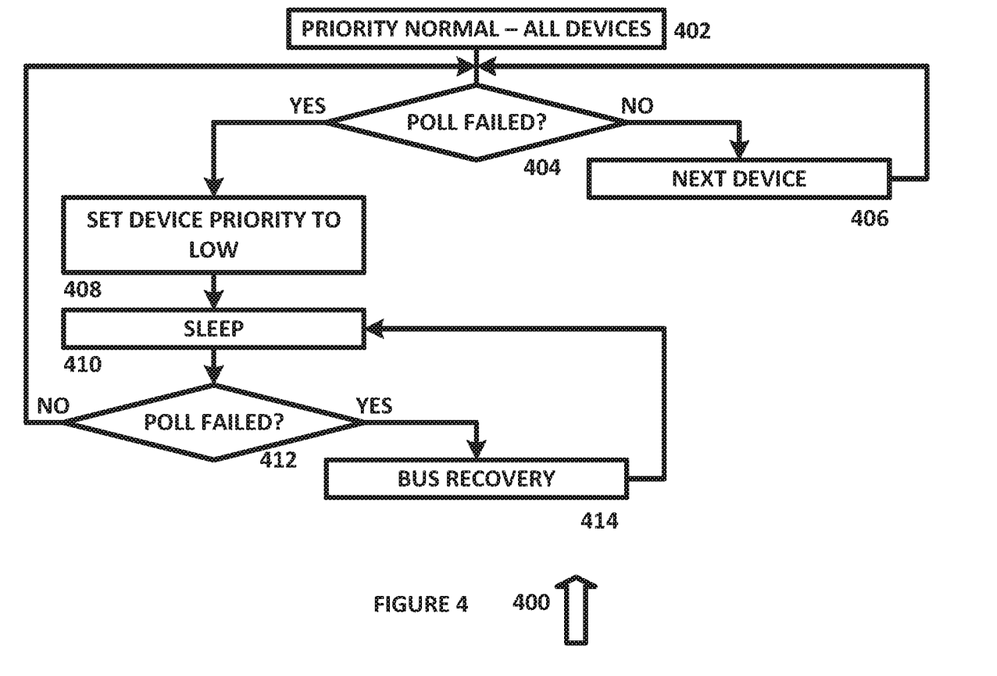
FIG. 4 is a diagram of an algorithm for modifying a polling priority, in accordance with an example embodiment of the present disclosure.

FIG. 4 is a diagram of an algorithm 400 for modifying a polling priority, in accordance with an example embodiment of the present disclosure. Algorithm 400 can operate on one or more processors.

Algorithm 400 can start with all devices having a normal priority and executed by normal priority thread, such as for devices that operate in conjunction and that are controlled over an I2C bus, or other suitable communications media. If a transaction fails, such as an I2C transaction, a priority register setting is changed to "low," such as in a device table, and the algorithm moves on to next device in the table. The normal priority thread can be used to handles all of the devices that have normal priority, such as I2C devices.

A low priority thread can remain dormant until a low priority device is located in the device table, such as an I2C device or other suitable devices. The low priority thread can handle the devices which have low priority, until the low priority device resumes responding normally, at which point the priority in the priority table can be changed to "normal" by the low priority thread or in other suitable manners.

In this example embodiment, the polling/monitor system can sleep for few seconds after processing every device, such as to provide I2C bandwidth to the normal priority thread or for other suitable purposes. In addition, bus recovery does not need to be performed every time, and can instead be performed every 2 or more times, to further provide normal priority thread bandwidth. An example status table is shown below:

| I2C Device virtual ID | Priority |
|---|---|
| 1 | low |
| 2 | normal |
| N | Normal |

Algorithm 400 begins at 402, where priority is set to normal for all devices. In one example embodiment, the devices can then be polled, such as over an I2C bus, with a status poll, a data request, a first threaded sequence of programmed instructions that can be managed independently by an operating system scheduler, or other suitable polls. The algorithm then proceeds to 404.

At 404, it is determined whether the poll has failed, such as if the device has failed to respond within a predetermined period of time, whether the device has responded with a failure code or an incorrect response, or any other failed response. If it is determined that the poll has not failed, the algorithm proceeds to 406 where the next device is selected. The algorithm then returns to 404 where the next device is polled, if there is one, or the same device is polled again after the first shorter delay period. If it is determined that the poll has failed, the algorithm proceeds to 408.

At 408, the device is set to a low priority thread. In one example embodiment, the low priority thread can be instantiated and the normal priority thread can be terminated, where the low priority thread has a lower priority than the normal priority thread, or other suitable processes can also or alternatively be used. The algorithm then proceeds to 410.

At 410, the polling or monitoring device sleeps or is otherwise made dormant for delay period. In one example embodiment, the delay can allow normal priority threads to operate. The algorithm then proceeds to 412, where it is determined whether or not the poll has failed. If it is determined that the poll has not failed, the algorithm returns to 404, and a state of the device can be modified or other suitable processes can be implemented, as discussed further herein. Otherwise, the algorithm proceeds to 414 where bus recovery is performed, and the algorithm returns to 410.

In operation, algorithm 400 allows a failed component to be removed from a first higher frequency polling loop to a second lower frequency polling loop, so as to conserve processing resources and bandwidth on an I2C bus or other suitable communications media. While algorithm 400 is shown as a flow chart, it can also or alternatively be implemented as two or more flow charts, one or more objects or agents, one or more state diagrams, on one or more processors or other devices, or in other suitable manners.

Figure 5:
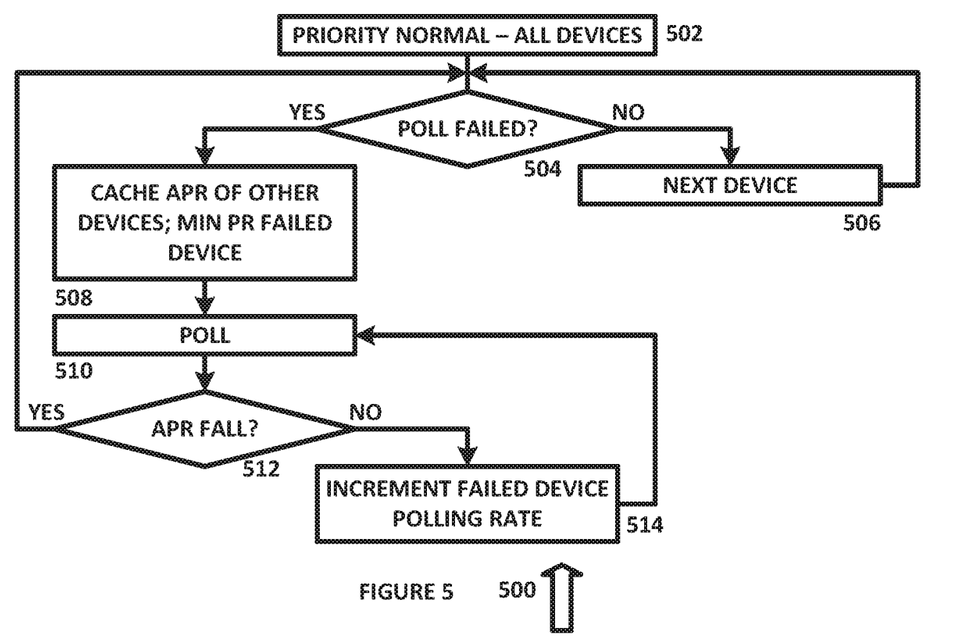
FIG. 5 is a diagram of an algorithm for maintaining an average polling rate, in accordance with an example embodiment of the present disclosure.

FIG. 5 is a diagram of an algorithm 500 for maintaining an average polling rate, in accordance with an example embodiment of the present disclosure. Algorithm 500 can be implemented on one or more processors.

Algorithm 500 can start with all devices having a normal priority executed by a normal priority thread, such as I2C devices. The polling frequency can then be reduced to the minimum polling response time, and the average polling response of the other devices in a device table can be determined. The polling rate of a device can then be increased until the average polling rate of other devices in the table starts to fall. Once a steady state polling rate for a device is found, the device polling rate is set to that value. An example polling rate table is shown below:

| I2C Device virtual ID | Max Polling Rate (MaxPR) | Min Polling Rate (MinPR) | Average Polling Rate (APR) |
|---|---|---|---|
| 1 | 50 | 10 | 20 |
| 2 | 100 | 20 | 100 |
| N | 50 | 10 | 50 |

Algorithm 500 begins at 502, where priority is set to normal for all devices. In one example embodiment, the devices can then be polled, such as over an I2C bus, with a status poll, a data request, a first threaded sequence of programmed instructions that can be managed independently by an operating system scheduler, or other suitable polls. The algorithm then proceeds to 504.

At 504, it is determined whether the poll has failed, such as if the device has failed to respond within a predetermined period of time, whether the device has responded with a failure code or an incorrect response, or any other failed response. If it is determined that the poll has not failed, the algorithm proceeds to 506 where the next device is selected. The algorithm then returns to 504 where the next device is polled, if there is one, or the same device is polled again after the first shorter delay period. If it is determined that the poll has failed, the algorithm proceeds to 508.

At 508, the average polling rate of the other devices is cached, in addition to the minimum polling rate of the failed device. The algorithm then proceeds to 510.

At 510, the device is polled, and the algorithm then proceeds to 512, where it is determined whether or not the average polling rate has fallen. If it is determined that the average polling rate has not fallen, the algorithm returns to 504, and a state of the device can be modified or other suitable processes can be implemented, as discussed further herein. Otherwise, the algorithm proceeds to 514 where the polling rate for the failed device is incremented, and the algorithm returns to 510.

In operation, algorithm 500 allows a failed component to be removed from a first higher frequency polling loop to a second lower frequency polling loop, so as to conserve processing resources and bandwidth on an I2C bus or other suitable communications media. While algorithm 500 is shown as a flow chart, it can also or alternatively be implemented as two or more flow charts, one or more objects or agents, one or more state diagrams, on one or more processors or other devices, or in other suitable manners.

Figure 6:
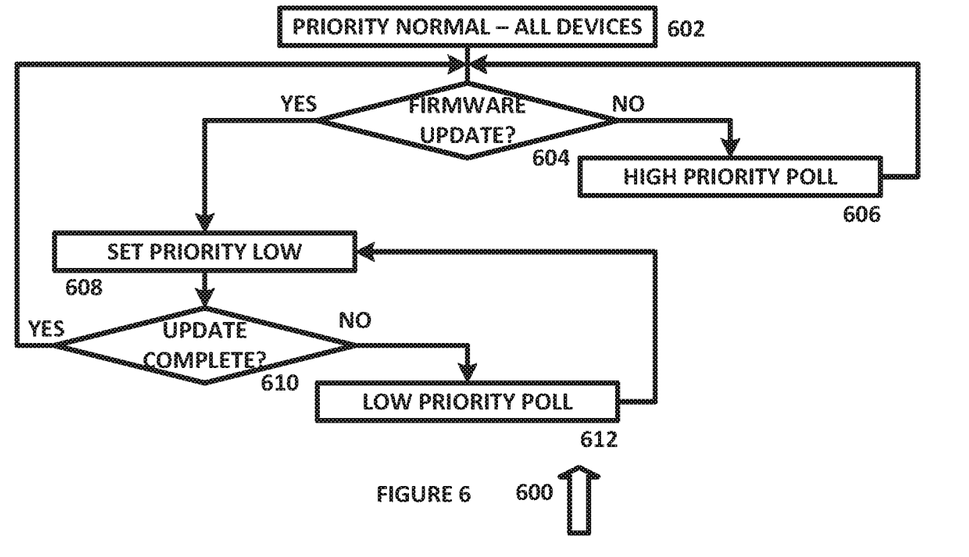
FIG. 6 is a diagram of an algorithm for updating firmware over a bus, in accordance with an example embodiment of the present disclosure.

FIG. 6 is a diagram of an algorithm 600 for updating firmware over an I2C bus, in accordance with an example embodiment of the present disclosure. Algorithm 600 can be implemented on one or more processors.

Algorithm 600 starts with all devices having normal priority and executed by a normal priority thread, such as I2C devices. When a firmware update is requested for an end device, priority is changed to low in the device table for all of the other devices. When the firmware update completes, the priority is returned to normal for all devices. An example priority table is shown below.

| I2C Device virtual ID | Priority (no firmware update) | Priority (firmware update for virtual ID 1) | Priority (firmware update completed) |
|---|---|---|---|
| 1 | normal | normal | normal |
| 2 | normal | low | normal |
| N | normal | low | normal |

Algorithm 600 begins at 602, where priority is set to normal for all devices. In one example embodiment, the devices can then be polled, such as over an I2C bus, with a status poll, a data request, a first threaded sequence of programmed instructions that can be managed independently by an operating system scheduler, or other suitable polls. The algorithm then proceeds to 604.

At 604, it is determined whether firmware update is available. If it is determined that the firmware update is not available, the algorithm proceeds to 606 where a high priority poll is selected. The algorithm then returns to 604 where the next device is polled, if there is one, or the same device is polled again after the first shorter delay period. If it is determined that a firmware update is available, the algorithm proceeds to 608.

At 608, the polling rate of the other devices is set to low. The algorithm then proceeds to 610.

At 610, it is determined whether the firmware update has completed. If the firmware update has not completed, the algorithm then proceeds to 612, where low priority polling is performed, and the algorithm returns to 608. If it is determined that the firmware update has completed, the algorithm returns to 604, and it is determined whether another device has a firmware update available.

In operation, algorithm 600 allows a firmware update to be provided over a suitable communications media, such as an I2C bus. While algorithm 600 is shown as a flow chart, it can also or alternatively be implemented as two or more flow charts, one or more objects or agents, one or more state diagrams, on one or more processors or other devices, or in other suitable manners.

Figure 7:
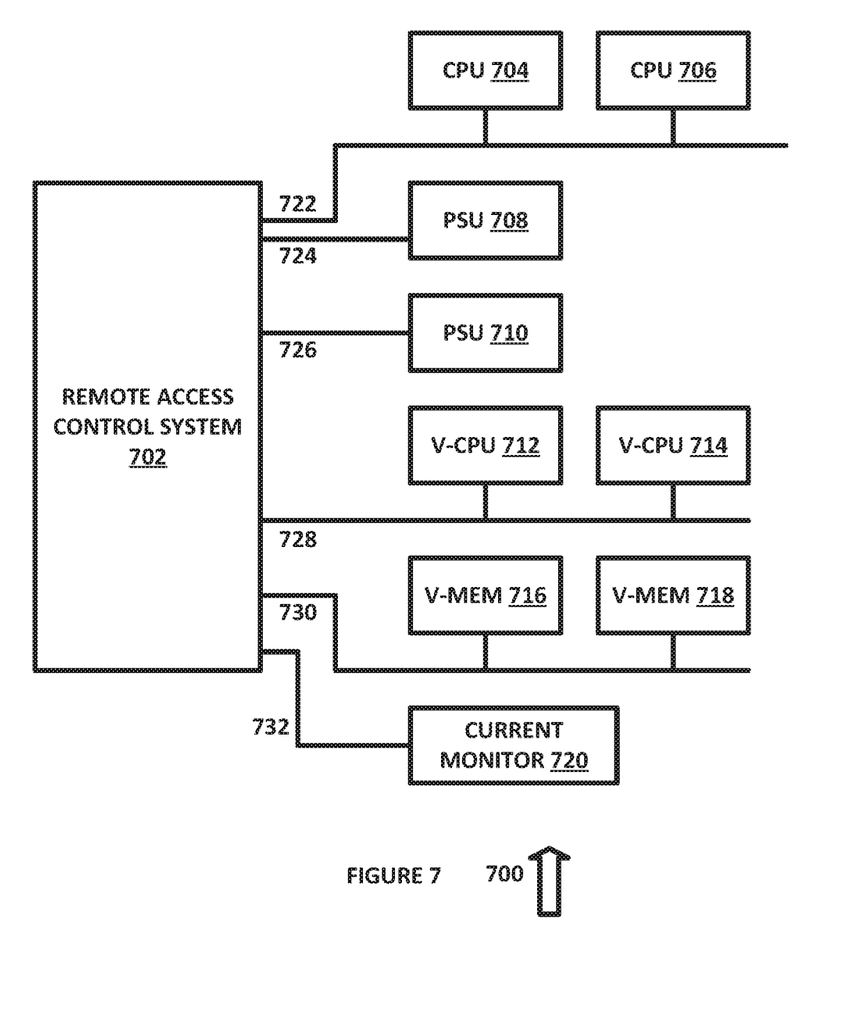
FIG. 7 is a diagram of a system for polling devices over a bus, in accordance with an example embodiment of the present disclosure.

FIG. 7 is a diagram of a system 700 for polling devices over an I2C bus or other suitable buses, in accordance with an example embodiment of the present disclosure. System 700 includes remote access control system 702, central processing units (CPUs) 704 and 706, power supply units (PSUs) 708 and 710, CPU voltage regulators (V-CPUs) 712 and 714, memory voltage regulators (V-MEMs) 716 and 718, current monitor 720, and communications ports 722 through 732, each of which can be implemented in hardware or a suitable combination of hardware and software.

Remote access control system 702 is used to poll the associated components and subsystems of system 700, update firmware and perform other functions, and can be an iDRAC or other suitable controllers. In one example embodiment, the disclosed algorithms for polling multiple components, installing firmware and performing other functions can be implemented using object oriented programming or other suitable programming paradigms that allow polling algorithms operating on other systems and components of system 700 to be controlled in a coordinated manner.

CPUs 704 and 706 can be general purpose CPUs, and include one or more power control algorithms that can include user-selectable configuration settings, such as maximum and minimum power settings, thermal settings, frequency settings or other suitable settings. Each CPU can thus implement its own power control scheme, independent of the overall system power control, and can respond to polls, update firmware and perform other functions in conjunction with remote access control system 702.

PSUs 708 and 710 can be power supplies, and include one or more polling response algorithms, firmware update algorithms and other suitable functionality that operates in conjunction with remote access control system 702.

CPU voltage regulator (V-CPU) 712 and 714 are used to control the voltage provided to a corresponding CPU, such as one of CPUs 704 and 706. V-CPU 712 and 714 include one or more polling response algorithms, firmware update algorithms and other suitable functionality that operates in conjunction with remote access control system 702.

Memory voltage regulator (V-MEM) 716 and 718 are used to control the voltage provided to a corresponding memory unit. V-MEM 716 and 718 include one or more polling response algorithms, firmware update algorithms and other suitable functionality that operates in conjunction with remote access control system 702.

Current monitor 720 monitors electrical current provided to one or more system components, such as CPUs 704 and 706, PSU 708 and 710, V-CPU 712 and 714, V-MEM 716 and 718 or other suitable components. Current monitor 720 includes one or more polling response algorithms, firmware update algorithms and other suitable functionality that operates in conjunction with remote access control system 702.

Communications ports 722 through 732 are used to provide communications between remote control access system 702 and other components of system 700. In one example embodiment, communications ports 722 through 732 can use the server message block (SMB) communications protocol, an I2C bus or other suitable communications protocols.

In operation, remote access control system 702 is configured to poll the separate systems and components of system 700, install firmware and perform other suitable functions as discussed herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for polling components, comprising:
   a plurality of processors; and
   a control system configured to interface with each of the plurality of processors, and to 1) poll each of the plurality of processors using a first polling loop and 2) transfer one of the plurality of processors to a second polling loop if the one of the plurality of processors is non-responsive to the poll and initiate bus recovery, wherein the control system is further
   configured to determine whether one of the plurality of processors requires a firmware update using inter-integrated circuit communications and to suspend polling of the other processors until the firmware update is completed.

2. The system of claim 1 wherein the control system is further configured to poll the one of the plurality of processors that is responsive to the poll at a lower polling rate in a second state that is distinct from a first state associated with the poll.

3. The system of claim 1 wherein the control system is further configured to poll the one of the plurality of processors that is responsive to the poll at a lower polling rate, and to transfer the one of the plurality of processors that is responsive to the poll back to the first polling loop when it becomes non-responsive to the poll.

4. The system of claim 1 wherein the control system is further configured to adjust a device priority as a function of the device non-response to a poll.

5. The system of claim 1 wherein the control system is further configured to determine an average polling rate of the plurality of processors and to adjust a device polling rate for one of the plurality of processors as a function of a change in the average polling rate.

6. A method for polling components, comprising:
  interfacing with each of a plurality of processors from a control system, wherein each processor is configured to always respond to a poll with data if the processor has not failed;
  polling each of the plurality of processors with the control system using a first polling loop;
  delaying a polling period for one of the plurality of processors if it responds to the poll and transferring the one of the plurality of processors to a second polling loop with the control system if the one of the plurality of processors is non-responsive to the poll and has previously responded to at least one poll as operative;
  determining whether one of the plurality of processors requires a firmware update; and
  suspending polling of the other processors by the control system until the firmware update is completed.

7. The method of claim 6 further comprising polling the one of the plurality of processors that is non-responsive to the poll at a lower polling rate with the control system.

8. The method of claim 6 further comprising:
  polling the one of the plurality of processors that is non-responsive to the poll at a lower polling rate; and
  transferring the one of the plurality of processors that is non-responsive to the poll back to the first polling loop when it becomes responsive to the poll.

9. The method of claim 6 further comprising adjusting a device priority as a function of the device response to a poll.

10. The method of claim 6 further comprising adjusting a device polling rate as a function of an average polling rate change.

11. A system for polling components, comprising:
  a plurality of processors, each configured to transmit data in response to a poll; and
  a monitoring module operating on a processor and configured to interface with each of the plurality of processors, and to 1) poll each of the plurality of processors at a maximum polling rate using a first polling loop and 2) transfer the plurality of processors to a second polling loop at a minimum polling rate if delay is detected, wherein the minimum polling rate is then increased towards the maximum polling rate and the monitoring module is further configured to determine whether one of the plurality of processors requires a firmware update and to transfer polling of the other processors to the second polling loop until the firmware update is completed.

12. The system of claim 11 wherein the monitoring module is further configured to poll the one of the plurality of processors that is non-responsive to the poll at a lower polling rate until the error condition is resolved.

13. The system of claim 11 further comprising means for polling the one of the plurality of processors that is non-responsive to the poll at a lower polling rate, and to transfer the one of the plurality of processors that is non-responsive to the poll back to the first polling loop when it becomes responsive to the poll.

14. The system of claim 11 wherein the monitoring module is further configured to adjust a device priority as a function of the device response to the poll or the device non-response to the poll due to the error condition.

15. The system of claim 11 wherein the monitoring module is further configured to adjust a device polling rate as a function of an average polling rate change.

16. The system of claim 1 wherein the first polling loop comprises a plurality of normal priority threaded polling processes and the second polling loop comprises a plurality of lower priority threaded polling processes for failed devices.

17. The system of claim 1 wherein the first polling loop comprises a plurality of normal priority threaded polling processes, the second polling loop comprises a plurality of lower priority threaded polling processes, and a thread of the first polling loop is terminated for one of the plurality of processors when it is determined that the one of the plurality of processors has failed due to non-response and a thread of the second polling loop is instantiated for the one of the plurality of processors.

* * * * *

UNITED STATES PATENT AND TRADEMARK OFFICE
CERTIFICATE OF CORRECTION

| | | |
|---|---|---|
| PATENT NO. | : 11,429,505 B2 | Page 1 of 1 |
| APPLICATION NO. | : 16/054489 | |
| DATED | : August 30, 2022 | |
| INVENTOR(S) | : Akkiah Choudary Maddukuri et al. | |

It is certified that error appears in the above-identified patent and that said Letters Patent is hereby corrected as shown below:

In the Claims

In Column 10, Lines 44-48, in Claim 1, delete "configured to . . . . completed." and insert the same at Line 43, after "further" as a continuation sub-point.

Signed and Sealed this
Eighth Day of November, 2022

Katherine Kelly Vidal
*Director of the United States Patent and Trademark Office*